United States Patent
Kaji

(10) Patent No.: US 11,095,840 B2
(45) Date of Patent: Aug. 17, 2021

(54) CONTROL APPARATUS AND IMAGING APPARATUS CAPABLE OF REDUCING POWER CONSUMPTION

(71) Applicant: SONY SEMICONDUCTOR SOLUTIONS CORPORATION, Kanagawa (JP)

(72) Inventor: Hidetaka Kaji, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/619,518

(22) PCT Filed: Apr. 5, 2018

(86) PCT No.: PCT/JP2018/014552
§ 371 (c)(1),
(2) Date: Dec. 5, 2019

(87) PCT Pub. No.: WO2018/230113
PCT Pub. Date: Dec. 20, 2018

(65) Prior Publication Data
US 2020/0099877 A1 Mar. 26, 2020

(30) Foreign Application Priority Data
Jun. 14, 2017 (JP) .............................. JP2017-116451

(51) Int. Cl.
*H04N 5/369* (2011.01)
*H04N 5/355* (2011.01)
*H04N 5/232* (2006.01)

(52) U.S. Cl.
CPC .......... *H04N 5/3698* (2013.01); *H04N 5/232* (2013.01); *H04N 5/3559* (2013.01)

(58) Field of Classification Search
CPC ......... H01L 24/43; H01L 24/03; H01L 24/85; H01L 2224/45015; H01L 24/48;
(Continued)

(56) References Cited

U.S. PATENT DOCUMENTS

| 6,850,278 B1 | 2/2005 | Sakurai et al. |
| 2004/0218088 A1* | 11/2004 | Borg ...................... H04N 5/374 348/362 |

(Continued)

FOREIGN PATENT DOCUMENTS

| JP | 11-018010 A | 1/1999 |
| JP | 2000-165755 A | 6/2000 |

(Continued)

OTHER PUBLICATIONS

International Search Report and Written Opinion of PCT Application No. PCT/JP2018/014552, dated Jun. 26, 2018, 11 pages of ISRWO.

*Primary Examiner* — Hung H Lam
(74) *Attorney, Agent, or Firm* — Chip Law Group

(57) ABSTRACT

A control apparatus includes an acquisition unit and a voltage control unit. The acquisition unit acquires imaging-related information relating to imaging to be executed by an imaging apparatus including a plurality of pixel units that converts incident light into charges and accumulate the charges. The voltage control unit controls, on the basis of the acquired imaging-related information, a drive voltage for driving each of the plurality of pixel units.

14 Claims, 14 Drawing Sheets

(58) Field of Classification Search
CPC ....... H01L 2224/0612; H01L 2924/381; H01L 24/05; H01L 2224/037; H01L 2224/04042; H01L 2224/78301; H01L 2224/48463; H01L 27/0203; H01L 23/488; H01L 23/49; H04N 5/3698; H04N 5/3559; H04N 5/232

See application file for complete search history.

(56) References Cited

U.S. PATENT DOCUMENTS

| | | | |
|---|---|---|---|
| 2005/0052554 A1 | 3/2005 | Sakurai et al. | |
| 2011/0050945 A1* | 3/2011 | Konno | H04N 5/3698 348/222.1 |
| 2013/0020466 A1* | 1/2013 | Ayers | H04N 5/243 250/208.1 |
| 2015/0062397 A1* | 3/2015 | Koh | H04N 5/3594 348/302 |
| 2015/0077609 A1* | 3/2015 | Okamoto | H04N 5/3698 348/303 |

FOREIGN PATENT DOCUMENTS

| | | |
|---|---|---|
| JP | 2004-222075 A | 8/2004 |
| JP | 2009-111717 A | 5/2009 |
| JP | 2011-205249 A | 10/2011 |

* cited by examiner

CONTROL APPARATUS AND IMAGING APPARATUS CAPABLE OF REDUCING POWER CONSUMPTION

CROSS REFERENCE TO RELATED APPLICATIONS

This application is a U.S. National Phase of International Patent Application No. PCT/JP2018/014552 filed on Apr. 5, 2018, which claims priority benefit of Japanese Patent Application No. JP 2017-116451 filed in the Japan Patent Office on Jun. 14, 2017. Each of the above-referenced applications is hereby incorporated herein by reference in its entirety.

TECHNICAL FIELD

The present technology relates to a control apparatus applicable to an imaging apparatus, and to the imaging apparatus.

BACKGROUND ART

An imaging apparatus including a solid-state imaging device such as a CMOS (Complementary Metal Oxide Semiconductor) image sensor and a CCD (Charge Coupled Devices) image sensor has been used from the past. For example, Patent Literature 1 discloses the technology for ensuring a dynamic range of FD (Floating Diffusion) as well as suppressing electric field-induced noise, regarding a CMOS image sensor. Specifically, by applying a bias voltage to the vertical signal line of the CMOS image sensor, the charge storage capacity of the FD is controlled (paragraphs [0055] to [0058] of the specification and FIGS. 7 and 8 in Patent Literature 1, and the like).

CITATION LIST

Patent Literature

Patent Literature 1: Japanese Patent Application Laid-open No. 2011-205249

DISCLOSURE OF INVENTION

Technical Problem

For example, the imaging apparatus is installed at a predetermined position and driven for a long time for observation, monitoring, or the like in some cases. In such a case, it is important to reduce the power consumption of the imaging apparatus.

In view of the circumstances as described above, it is an object of the present technology to provide a control apparatus and an imaging apparatus capable of reducing the power consumption.

Solution to Problem

In order to achieve the above-mentioned object, a control apparatus according to an embodiment of the present technology includes an acquisition unit; and a voltage control unit.

The acquisition unit acquires imaging-related information relating to imaging to be executed by an imaging apparatus including a plurality of pixel units that converts incident light into charges and accumulate the charges.

The voltage control unit controls, on a basis of the acquired imaging-related information, a drive voltage for driving each of the plurality of pixel units.

In this control apparatus, on the basis of the acquired imaging-related information, the drive voltage for driving the pixel units is controlled. As a result, it is possible to reduce the power consumption.

The imaging-related information may include at least one of illuminance of an object, luminance distribution of a captured image, an amount of motion of the object.

By controlling the drive voltage on the basis of at least one of the illuminance of the object, the luminance distribution of the captured image, and the amount of motion of the object, it is possible to reduce the power consumption.

The voltage control unit may decrease, where the illuminance of the object is high, the drive voltage and increase, where the illuminance of the object is low, the drive voltage.

As a result, is possible to reduce the power consumption.

The voltage control unit may decrease, where luminance dispersion of the captured image is small, the drive voltage and increase, where the luminance dispersion of the captured image is large, the drive voltage.

As a result, is possible to reduce the power consumption.

The voltage control unit may decrease, where the amount of motion of the object is small, the drive voltage and increase, where the amount of motion of the object is large, the drive voltage.

As a result, is possible to reduce the power consumption.

The voltage control unit may set, on a basis of the acquired imaging-related information, the drive voltage as a first drive voltage for imaging an object.

As a result, is possible to reduce the power consumption.

The voltage control unit may set the drive voltage as a second drive voltage for acquiring the imaging-related information. In this case, the acquisition unit may acquire the imaging-related information on a basis of an image signal obtained by driving of at least a part of the plurality of pixel units with the second drive voltage.

As a result, it is possible to easily acquire the imaging-related information with high accuracy.

The voltage control unit may control the second drive voltage on a basis of the acquired imaging-related information.

As a result, it is possible to shorten the time necessary for switching from the second drive voltage to the first drive voltage.

The voltage control unit may control the second drive voltage to be the first drive voltage corresponding to the acquired imaging-related information.

As a result, it is possible to shorten the time necessary for switching from the second drive voltage to the first drive voltage.

The voltage control unit may control the second drive voltage to approach the first drive voltage corresponding to the acquired imaging-related information.

As a result, it is possible to shorten the time necessary for switching from the second drive voltage to the first drive voltage.

The acquisition unit may acquire the imaging-related information on a basis of an image signal obtained by driving of at least a part of the plurality of pixel units with the first drive voltage. In this case, the voltage control unit may control the first drive voltage on a basis of the acquired imaging-related information.

As a result, it is possible to acquire the imaging-related information during imaging of an object to control the drive voltage. As a result, it is possible to reduce the power consumption.

The voltage control unit may control a voltage to be applied to a capacitive device unit of each of the plurality of pixel units, the capacitive device unit accumulating the converted charges.

As a result, is possible to reduce the power consumption.

The plurality of pixel units may be configured as a pixel unit of a CMOS image sensor or a pixel unit of a CCD image sensor.

An imaging apparatus according to an embodiment of the present technology includes: a plurality of pixel units; an acquisition unit; and a voltage control unit.

The plurality of pixel units converts incident light into charges and accumulate the charges.

The acquisition unit acquires imaging-related information relating to imaging.

The voltage control unit controls, on a basis of the acquired imaging-related information, a drive voltage for driving each of the plurality of pixel units.

Advantageous Effects of Invention

As described above, in accordance with the present technology, it is possible to reduce the power consumption. It should be noted that the effect described here is not necessarily limitative and may be any effect described in the present disclosure.

BRIEF DESCRIPTION OF DRAWINGS

FIG. 13 is a diagram showing an example of the luminance dispersion of the captured image.

MODE(S) FOR CARRYING OUT THE INVENTION

Hereinafter, embodiment according to the present technology will be described with reference to the drawings.

First Embodiment

[Configuration of Imaging System]

Figure 1:
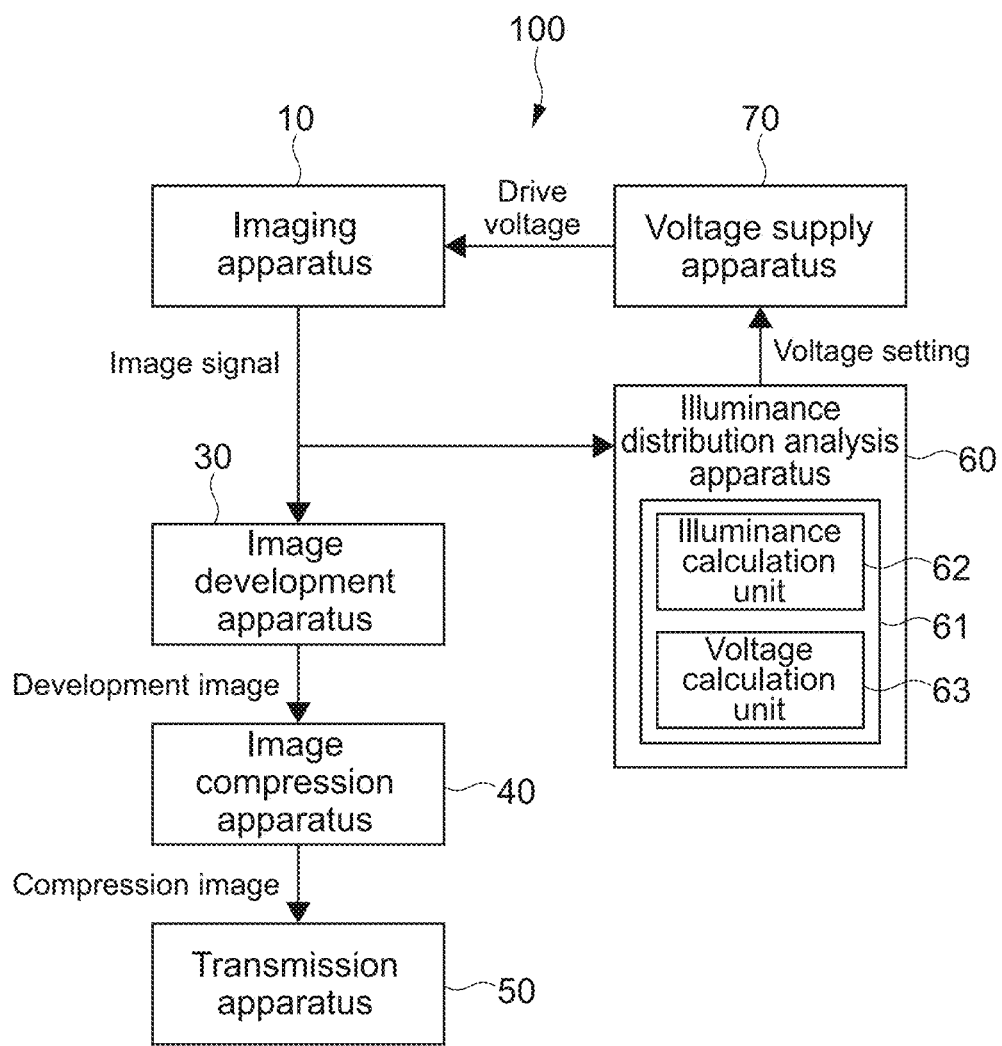
FIG. 1 is a block diagram showing a configuration example of an imaging system according to a first embodiment.

FIG. 1 is a block diagram showing a configuration example of an imaging system according to a first embodiment of the present technology. An imaging system 100 includes an imaging apparatus 10, an image development apparatus 30, an image compression apparatus 40, a transmission apparatus 50, an illuminance distribution analysis apparatus 60, and a voltage supply apparatus 70.

The imaging apparatus 10 includes a solid-state imaging device and generates an image signal of an object. The solid-state imaging device includes a plurality of pixel cells (see FIG. 2), and is capable of converting incident light into charges by each pixel cell 11 and accumulating the charges. A pixel signal is generated on the basis of the potential corresponding to the charges accumulated by each pixel cell 11.

That is, the pixel signal is a signal including information regarding the potential corresponding to the accumulated charges. Then, the image signal of the object is a signal including a plurality of pixel signals corresponding to the plurality of pixel cells 11. In this embodiment, as the solid-state imaging device, a CMOS image sensor is used.

The image development apparatus 30 executes development processing on the basis of the image signal output from the imaging apparatus 10 to generate image data of the object. For example, arbitrary processing such as gradation and color correction, noise removal, distortion correction, and size conversion may be executed. The image development apparatus 30 can also generate unprocessed RAW image data.

The image compression apparatus 40 compresses the image data of the object or the RAW image data. The compression method and the like are not limited, and an arbitrary data compression technology may be used. The transmission apparatus 50 transmits the compressed image data of the object, or the like by an arbitrary communication method by wire or wireless.

The illuminance distribution analysis apparatus 60 sets a drive voltage for driving the imaging apparatus 10. Specifically, the illuminance distribution analysis apparatus 60 acquires imaging-related information relating to imaging by the imaging apparatus 10. Then, the illuminance distribution analysis apparatus 60 controls, on the basis of the acquired imaging-related information, the drive voltage for driving each of the plurality of pixel cells 11.

In this embodiment, the illuminance of the object is calculated on the basis of the image signal output from the imaging apparatus 10. Then, on the basis of the calculated illuminance of the object, a drive voltage to be supplied to the imaging apparatus 10 is calculated. The calculated drive voltage is output to the voltage supply apparatus 70 as a set voltage.

As shown in FIG. 1, the illuminance distribution analysis apparatus 60 includes a controller 61. The controller 61 includes hardware necessary for the configuration of a computer, such as a CPU, a ROM, a RAM, and an HDD. The CPU loads the program recorded in the ROM or the like in advance into the RAM and executes the program, thereby executing a voltage control method according to the present technology.

The specific configuration of the controller 61 is not limited. For example, a device such as an FPGA (Field Programmable Gate Array) and an ASIC (Application Specific Integrated Circuit) may be used.

In this embodiment, the CPU of the controller 61 executes a predetermined program, thereby realizing an illuminance calculation unit 62 and a voltage calculation unit 63 as function blocks. Note that in order to realize each function block, dedicated hardware such as an IC may be used as appropriate.

The illuminance calculation unit 62 calculates the illuminance of the object on the basis of the image signal output from the imaging apparatus 10. That is, on the basis of the potential information included in the plurality of pixel signals, the illuminance of the object to be imaged is calculated. The method of calculating the illuminance on the basis of the image signal is not limited, and an arbitrary algorithm may be used.

The voltage calculation unit 63 calculates a drive voltage on the basis of the calculated illuminance of the object. The method of calculating the drive voltage on the basis of the illuminance will be described below. In this embodiment, the illuminance calculation unit 62 and the voltage calculation unit 63 respectively correspond to an acquisition unit and a voltage control unit.

The voltage supply apparatus 70 supplies, to the imaging apparatus 10, the drive voltage set by the illuminance distribution analysis apparatus 60. For example, the voltage supply apparatus 70 converts the supply voltage supplied from the outside into a set drive voltage, and supplies the voltage to the imaging apparatus 10. Alternatively, the method of supplying the set drive voltage to the imaging apparatus 10 is not limited, and an arbitrary method may be used.

Figure 2:
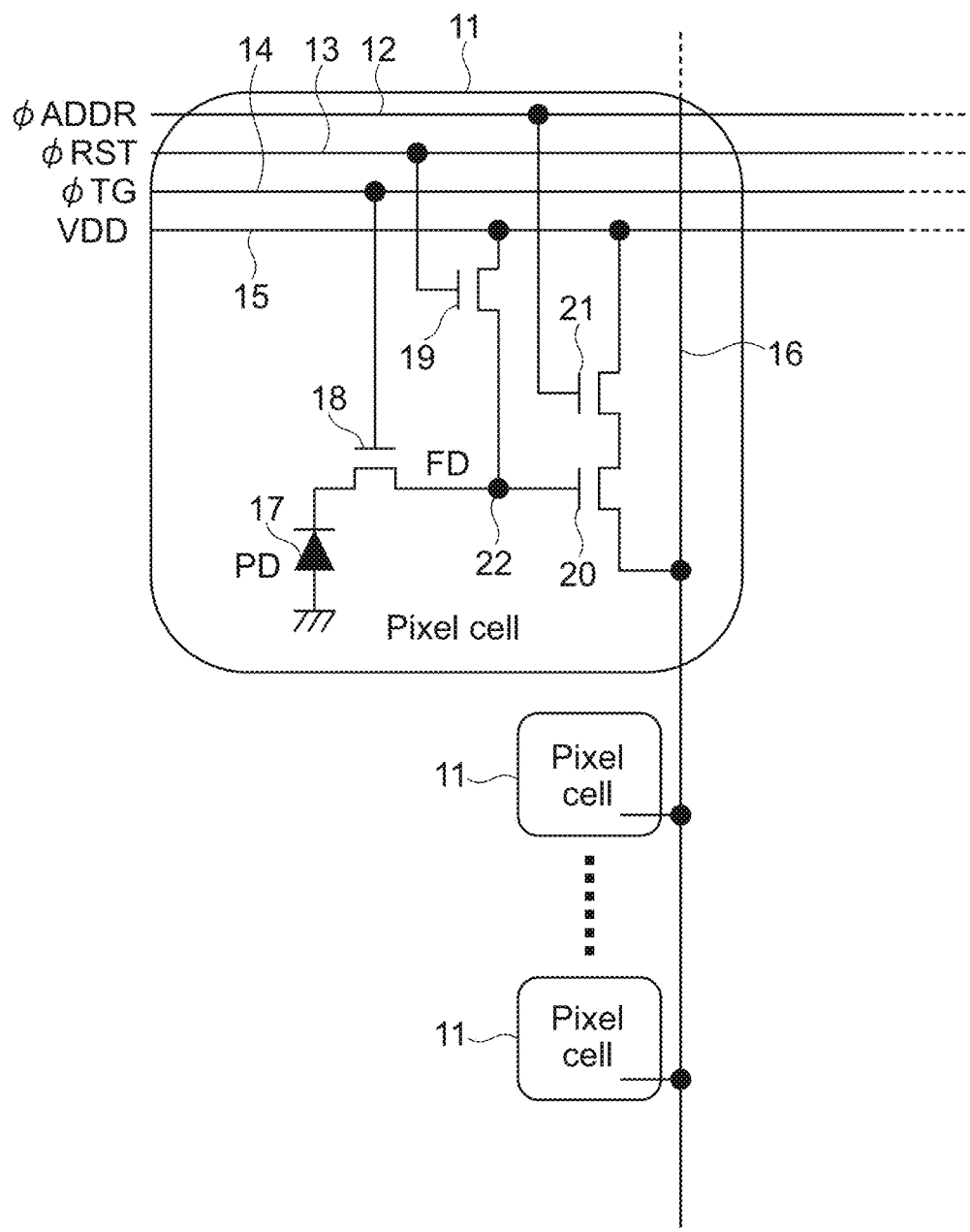
FIG. 2 is a schematic diagram showing a configuration example of a pixel cell of a CMOS image sensor.

FIG. 2 is a schematic diagram showing a configuration example of the pixel cells 11 of the CMOS image sensor of the imaging apparatus 10. In the CMOS image sensor, the plurality of pixel cells 11 is arranged in an array of N rows and M columns. For each row, the plurality of pixel cells 11 is connected in parallel to each of an address line 12, a reset line 13, a read line 14, and a power source line 15. For each column, the plurality of pixel cells 11 is connected in parallel to a vertical signal line 16.

As shown in FIG. 2, the pixel cells 11 each include a PD (Photo Diode) 17, a read transistor 18, a reset transistor 19, an amplification transistor 20, an address transistor 21, and an FD 22. While a power source voltage VDD is applied to the power source line 15, an address signal φADDR, a reset signal φRST, and a read signal φG are output to the address line 12, the reset line 13, and the read line 14 at a predetermined timing.

As a result, each transistor operates at a predetermined timing, and the charges converted by the PD 17 are read out to the FD 22. Then, the pixel signal corresponding to the charges read out to the FD 22 is output to the vertical signal line 16 via the amplification transistor 20. A vertical scanning circuit and a horizontal scanning circuit (which are not shown) operate, and thus, the pixel cells 11 are driven for row. The pixel signal output to each vertical signal line 16 is output for each column. As a result, the pixel signal of each pixel cell 11 is output.

In this embodiment, the plurality of pixel cells 11 correspond to a plurality of pixel units. Further, the FD 22 corresponds to a capacitive device unit of each of the plurality of pixel cells 11, which accumulates the converted charges. The capacity of the FD 22 is defined by the power source voltage VDD applied to the FD 22. When the power source voltage VDD is increased, the capacity of the FD 22 is increased. When the power source voltage VDD is decreased, the capacity of the FD 22 is decreased. It can be said that the capacity of the FD 22 is the depth of the potential well of the FD 22.

In this embodiment, by controlling the drive voltage to be supplied from the voltage supply apparatus 70 to the imaging apparatus 10, it is possible to control the power source voltage VDD to be applied to the FD 22. Specifically, when the drive voltage is increased, the power source voltage VDD is increased. When the drive voltage is decreased, the power source voltage VDD is decreased. That is, in this embodiment, by controlling the drive voltage for driving each of the plurality of pixel cells 11, it is possible to control the voltage to be applied to the FD 22 of each of the plurality of pixel cells 11. This can be also said that by controlling the drive voltage, the capacity of the FD 22 can be controlled.

The configuration of the pixel cell 11, the capacitive device unit in the pixel cell 11, and the method of outputting the pixel signal are not limited to those described above. An arbitrary configuration, an arbitrary capacitive device unit, and an arbitrary output method may be used. An arbitrary configuration and an arbitrary output method may be used as long as it is possible to control the capacity of the capacitive device unit in the pixel cell 11 by setting the drive voltage as appropriate by the illuminance distribution analysis apparatus 60.

In this embodiment, the illuminance distribution analysis apparatus 60 corresponds to a control apparatus. Further, control of the drive voltage includes both generating a drive voltage to actually supply the drive voltage to an imaging apparatus and setting the drive voltage to be supplied to the imaging apparatus 10 to output the set voltage to the voltage supply apparatus 70 as in this embodiment.

Figure 3:
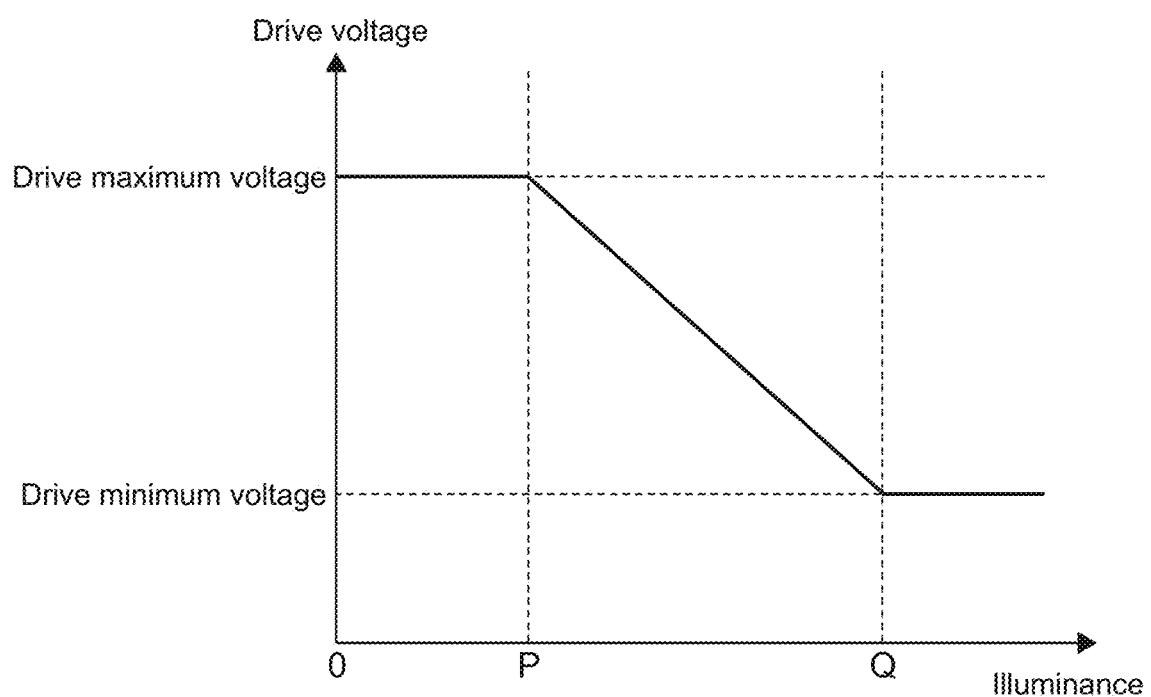
FIG. 3 is a graph showing an example of controlling a drive voltage in accordance with the illuminance of an object.

FIG. 3 is a graph showing an example of controlling the drive voltage corresponding to the illuminance of the object. In this embodiment, when the illuminance of the object is high, the drive voltage is decreased. When the illuminance of the object is low, the drive voltage is increased. Specifically, as shown in FIG. 3, the drive maximum voltage is set in the range of illuminance from zero (x1) to predetermined illuminance P (x1), and the voltage is set to be linearly decreased to the drive minimum voltage in accordance with the increase in illuminance in the range of illuminance from the illuminance P (x1) to predetermined illuminance Q (x1). In the range higher than the illuminance Q (x1), the drive minimum voltage is set.

The drive voltage is appropriately set so that, for example, image quality capable of acquiring necessary information from a captured image is realized in observation, monitoring, or the like. For example, depending on the content of the observation, monitoring, or the like, necessary information can be acquired and the purpose can be achieved even with a captured image with reduced image quality in some cases. Paying attention to this point, the present inventors has found that a drive voltage corresponding to the illuminance is set so that the minimum drive voltage is supplied. As a result, it has become possible to realize power consumption.

The illuminance P (x1) and the illuminance Q (x1) shown in FIG. 3 only need to be appropriately set on the basis of the characteristics of the imaging apparatus, imaging conditions, imaging environment, imaging purpose, object type, and the like. Further, the present technology is not limited to the linear control, and arbitrary control such as non-linear control using polynomials, exponents/logarithms, or the like and phased control in a stepwise manner may be executed.

[Imaging Operation By Imaging System]

Figure 4:
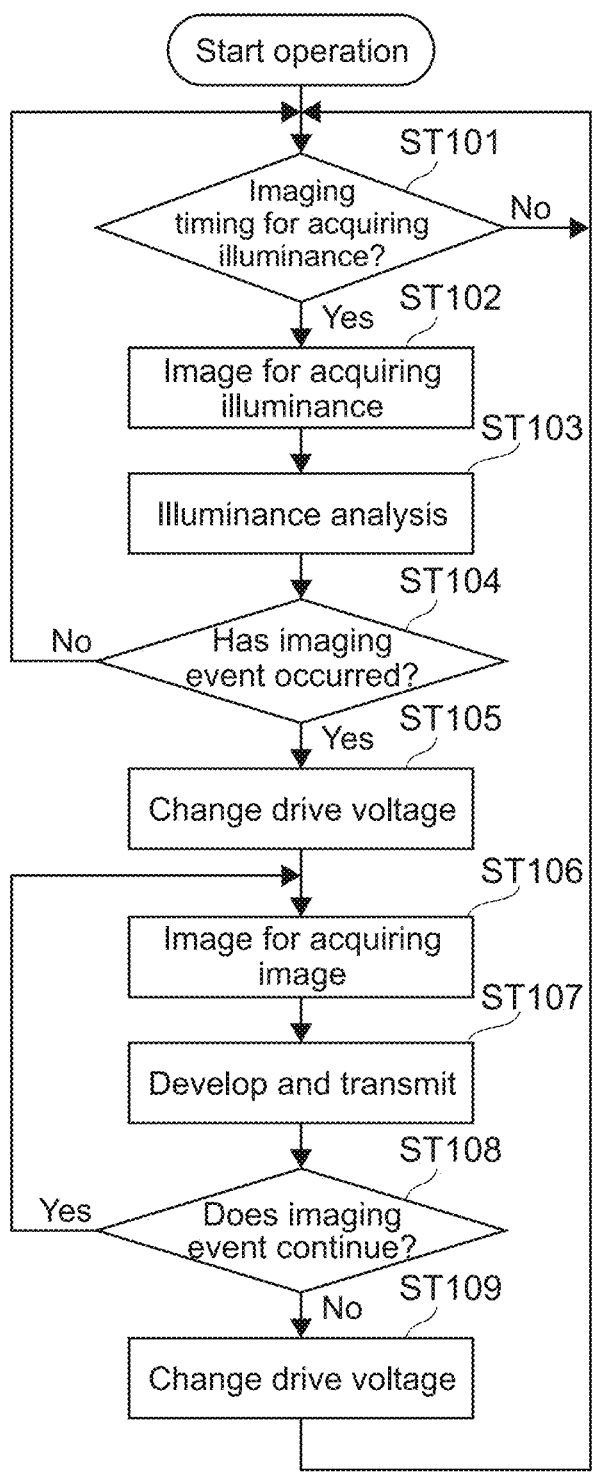
FIG. 4 is a flowchart showing an example of an imaging operation by an imaging system.
Figure 5A:
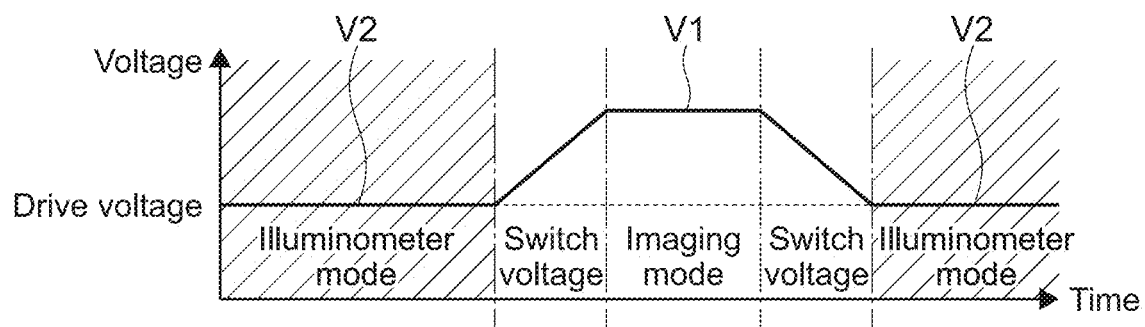
FIGS. 5A and 5B FIGS. 5A and 5B are graphs showing an example of a temporal change in drive voltage in the imaging operation shown in FIG. 4.
Figure 5B:
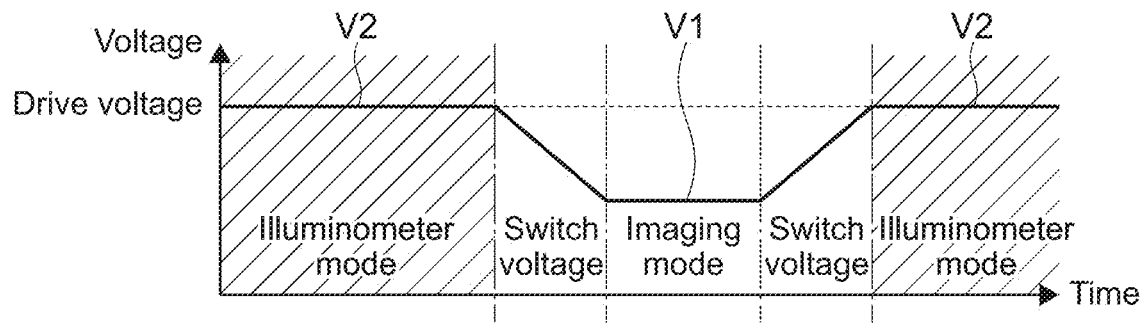

FIG. 4 is a flowchart sowing an example of the imaging operation by the imaging system 100. FIGS. 5A and 5B are graphs showing an example of a temporal change in drive voltage in the imaging operation shown in FIG. 4.

In this embodiment, the imaging system 100 executes an operation in an illuminometer mode and an operation in an imaging mode. The illuminometer mode is a mode for calculating the illuminance of the object, and the illuminance of the object is calculated on the basis of the image signal acquired by driving of at least a part of the plurality of pixel cells 11. The imaging mode is a mode for imaging the object. The drive voltage is set on the basis of the calculated illuminance and the drive voltage is supplied to the imaging apparatus 10, thereby imaging the object.

As shown in FIG. 4, whether or not it is an imaging timing for acquiring illuminance is monitored (Step 101). In the case where it is determined that it is imaging timing for acquiring illuminance (Yes in Step 101), the illuminometer mode is selected. The imaging timing for acquiring illuminance is set, for example, a predetermined time period before an imaging event that occurs at a time set in advance. Alternatively, an arbitrary timing at which the drive voltage for imaging the object can be appropriately set is set as the imaging timing for acquiring illuminance.

When the illuminometer mode is selected, imaging for acquiring illuminance is executed (Step 102). Specifically, the illuminance distribution analysis apparatus 60 sets a drive voltage V2 for acquiring illuminance. Then, the voltage supply apparatus 70 supplies the drive voltage V2 for acquiring illuminance to the imaging apparatus 10, and the object is imaged. Note that while the imaging even does not occur, the drive voltage V2 for acquiring illuminance may always be set. In this embodiment, the drive voltage V2 for acquiring illuminance corresponds to a second drive voltage.

The specific magnitude of the drive voltage V2 for acquiring illuminance is not limited. For example, as shown in FIG. 5A, a relatively low voltage may be set as the drive voltage V2 for acquiring illuminance. For example, the drive minimum voltage shown in FIG. 3 may be set as the drive voltage for acquiring illuminance. As a result, it is possible to reduce the power consumption of the imaging apparatus 10.

Alternatively, as shown in FIG. 5B, a relatively high voltage may be set as the drive voltage V2 for acquiring illuminance. For example, the drive maximum voltage shown in FIG. 3 may be set as the drive voltage V2 for acquiring illuminance. As the drive voltage V2 for acquiring illuminance and a drive voltage V1 for imaging determined on the basis of the illuminance, optimal voltages may be set as appropriate without defining the voltage level relationship. As a result, in each of the illuminometer mode and the imaging mode, the operation with the optimal power consumption is realized.

For example, in the illuminometer mode, the number of pixel cells 11 to be driven may be limited. That is, by driving only a part of the pixel cells 11, an image signal including the pixel signal corresponding to the part of the pixel cells 11 may be generated. As a result, it is possible to suppress the power consumption even in the case where the drive voltage V2 for acquiring illuminance is set relatively high.

As a result, it is possible to acquire highly accurate illuminance information while suppressing the power consumption. It goes without saying that a possible method includes setting the drive voltage V2 for acquiring illuminance low and limiting the number of pixel cells 11 to be driven. In this case, it is possible to sufficiently suppress the power consumption.

The imaging apparatus 10 may include a light reception device for measuring illuminance in addition to the plurality of pixel cells 11. Then, the illuminance of the object may be calculated on the basis of the signal corresponding to the amount of received light of the light reception device for measuring illuminance. By adopting a configuration capable of driving the light reception device for measuring illuminance with power consumption lower than that in the case of driving the plurality of pixel cells 11, it is possible to realize further lower power consumption.

The illuminance calculation unit 62 executes illuminance analysis on the basis of the image signal output from the imaging apparatus 10 (Step 103). That is, the illuminance of the object is calculated on the basis of the image signal obtained by driving of at least a part of the plurality of pixel cells 11 with the drive voltage V2 for acquiring illuminance.

Whether or not an imaging event has occurred is determined (Step 104). The imaging even is set in advance to occur at a predetermined time, e.g., once an hour or 10 times a day. It goes without saying that the present technology is not limited thereto, and the imaging even may occur by a shutter operation by a user. In the case where the imaging even has not occurred (No in Step 104), the processing returns to Step 101.

In the case where it is determined that the imaging event has occurred (Yes in Step 104), the mode is switched to the imaging mode and the drive voltage is changed (Step 105). That is, the voltage calculation unit 63 calculates, on the basis of the illuminance of the object calculated in Step 103, the drive voltage V1 for imaging the object. Then, the drive voltage is changed from the drive voltage V2 for acquiring illuminance to the drive voltage V1 for imaging, and supplied to the imaging apparatus 10. In this embodiment, the drive voltage V1 for imaging for imaging corresponds to a first drive voltage.

As shown in FIGS. 5A and 5B, a voltage stabilization time period is provided after switching the drive voltage. After the voltage stabilization time period has elapsed, imaging for acquiring an image of the object is executed while the drive voltage V1 for imaging is stably supplied (Step 106).

On the basis of the image signal output from the imaging apparatus 10, development processing is executed by the image development apparatus 30 to generate image data. The image compression apparatus 40 compresses the image data, and the transmission apparatus 50 transmits the image data (Step 107).

Whether or not the imaging event continues is determined (Step 108). In the case where the imaging event continues (Yes in Step 108), the processing returns to Step 106 and imaging continues. In the case where the imaging event has not continued (No in Step 108), the imaging mode is terminated and the drive voltage is changed (Step 109). For example, the drive voltage is changed from the drive voltage V1 for imaging to the drive voltage V2 for acquiring illuminance.

In the example shown in FIG. 5A, the drive voltage is changed from the drive voltage V2 for acquiring illuminance to the drive voltage V1 for imaging higher than that in accordance with the switching of the mode from the illuminometer mode to the imaging mode. Then, when the imaging mode is terminated, the mode is switched to the illuminometer mode and the drive voltage is changed to the drive voltage V2 for acquiring illuminance. In the case where the drive voltage V1 of the imaging mode determined on the basis of the illuminance information is higher than the drive voltage V2 of the illuminometer mode, the operation of increasing the drive voltage when the mode transits to the imaging mode is performed as shown in the figure.

In the example shown in Part B of FIG. 5B, the drive voltage is changed from the drive voltage V2 for acquiring illuminance to the drive voltage V1 for imaging lower than that in accordance with the switching of the mode from the illuminometer mode to the imaging mode. Then, when the imaging mode is terminated, the mode is switched to the illuminometer mode and the drive voltage is changed to the drive voltage V2 for acquiring illuminance. In the case where the drive voltage V1 of the imaging mode determined on the basis of the illuminance information is lower than the drive voltage V2 of the illuminometer mode, the operation of decreasing the drive voltage when the mode transits to the imaging mode is performed as shown in the figure.

As shown in FIGS. 5A and Part B of FIG. 5B, there is no level relationship between the drive voltage V1 of the imaging mode and the drive voltage V2 of the illuminometer mode, the modes operate with drive voltages necessary for realizing optimal power consumption, and the control unit performs the voltage change in mode transition so as to achieve the optimal drive voltage. The optimal drive voltage in the illuminometer mode here is determined by, for example, the accuracy of the illuminance of the object and the condition of the power consumption. Further, by limiting the number of pixel cells 11 to be driven, it is also possible to suppress the power consumption.

It goes without saying that the drive voltage V1 for imaging may be set in a range including ranges higher and lower than the drive voltage V2 for acquiring illuminance.

In addition to the imaging mode and the illuminometer mode, a standby mode may be set. For example, in the case where an imaging event has not occurred and it is not the imaging timing for acquiring illuminance, the standby mode is set. In the standby mode, for example, a voltage lower than the drive minimum voltage is set. Alternatively, the voltage supply to the imaging apparatus 10 is temporarily stopped. As a result, is possible to reduce the power consumption.

Figure 6:
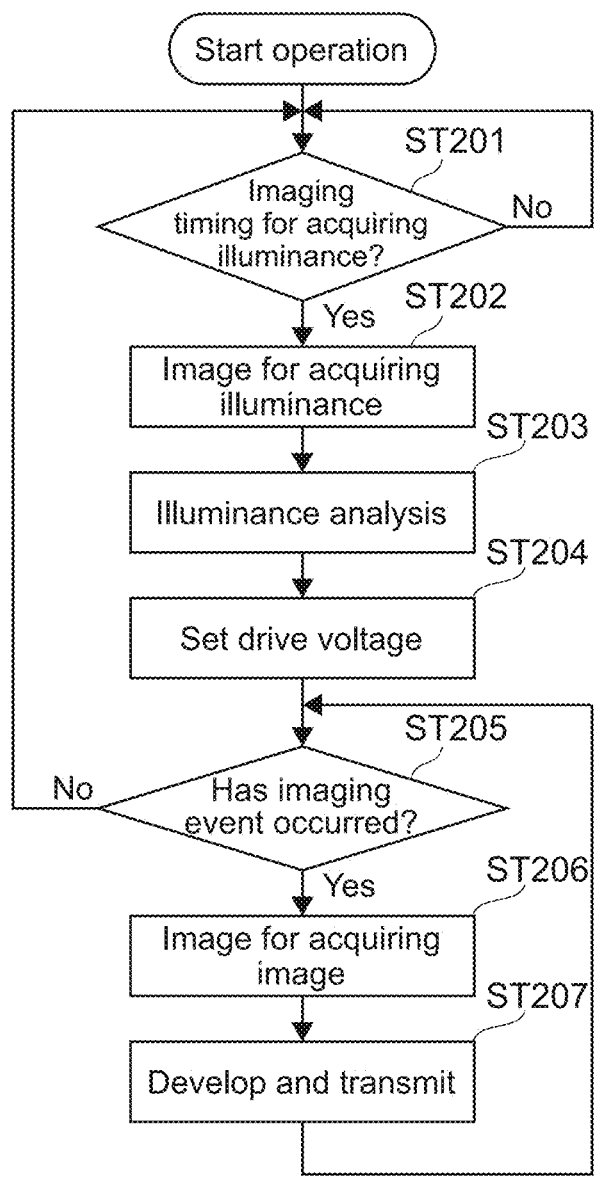
FIG. 6 is a flowchart showing another example of the imaging operation by the imaging system.
Figure 7:
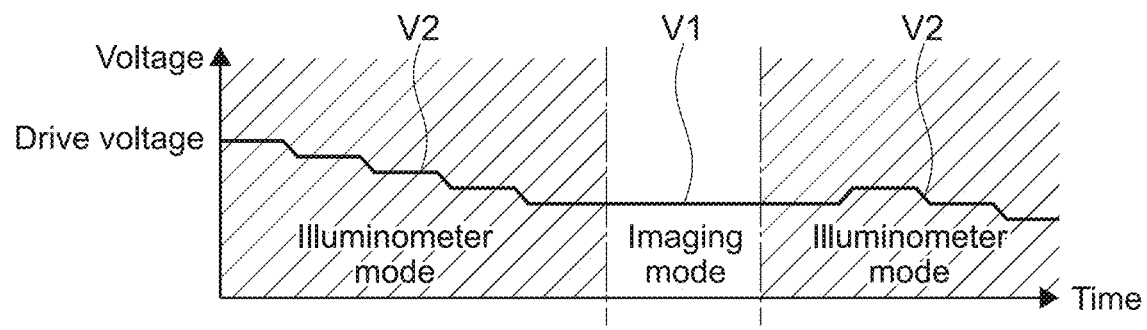
FIG. 7 is a graph showing an example of a temporal change in drive voltage in the imaging operation shown in FIG. 6.

FIG. 6 is a flowchart showing another example of the imaging operation by the imaging system 100. FIG. 7 is a graph showing an example of a temporal change in drive voltage in the imaging operation shown in FIG. 6. In the examples shown in FIG. 6 and FIG. 7, the drive voltage V2 for acquiring illuminance is controlled during the illuminometer mode. Specifically, on the basis of the illuminance of the object calculated by the illuminance distribution analysis apparatus 60, the drive voltage V2 for acquiring illuminance is controlled so as to achieve the drive voltage V1 for imaging corresponding to the illuminance.

As shown in FIG. 6, in the case where it is determined that it is the imaging timing for acquiring illuminance (Yes in Step 201), the illuminometer mode is selected. When the illuminometer mode is selected, the drive voltage V2 for acquiring illuminance is set and the imaging for acquiring illuminance is executed (Step 202).

The illuminance analysis is executed on the basis of the image signal output from the imaging apparatus 10 (Step 203). The drive voltage V2 for acquiring illuminance is set so as to achieve the drive voltage V1 for imaging corresponding to the calculated illuminance of the object (Step 204). Then, the illuminometer mode continues at the same drive voltage as the drive voltage V1 for imaging. Note that the drive voltage V1 for imaging corresponding to the illuminance of the object represents the drive voltage V1 for imaging calculated by the voltage calculation unit 63 on the basis of the illuminance.

Whether or not an imaging event has occurred is determined (Step 205). In the case where it is determined that an imaging event has not occurred (No in Step 205), the processing returns to Step 201 and control of the drive voltage V2 for acquiring illuminance is repeated. In the example shown in FIG. 7, the drive voltage V2 for acquiring illuminance is changed four times before shifting to the imaging mode.

In the case where it is determined that an imaging event has occurred (Yes in Step 205), the mode is switched to the imaging mode. Then, imaging for acquiring an image of an object is executed with the drive voltage V2 for acquiring illuminance at that time (Step 206). That is, the drive voltage V2 for acquiring illuminance at the time of switching to the imaging mode is used as the drive voltage V1 for imaging an object without change, and the object is imaged.

In the case where the illuminance necessary for determining the drive voltage V1 for imaging can be acquired even when the drive voltage V2 for acquiring illuminance is controlled during the illuminometer mode as described above, by changing the drive voltage during the illuminometer mode, it is possible to reduce the voltage stabilization waiting time period after switching the voltage. That is, it is possible to shorten the time necessary for switching the drive voltage from the drive voltage V2 for acquiring illuminance to the drive voltage V1 for imaging.

In the illuminometer mode, since it only needs to be capable of measuring the illuminance of the object, the necessary image quality is often lower than that in the imaging mode. Therefore, even when the drive voltage is changed during measurement, the influence on the measurement is small in some cases. Note that processing such as numerical correction may be performed on the result of calculating the illuminance in accordance with the change in drive voltage during measurement. As a result, it is possible to improve the measurement accuracy.

The development and transmission of the captured image are executed (Step 207), the processing returns to Step 205, and whether or not an imaging event is occurring is determined. In the case where the imaging event is finished (No in Step 205), the imaging mode is terminated and the processing returns to Step 201. In the example shown in FIG. 7, when the imaging mode is terminated, the mode is switched to the illuminometer mode and control of the drive voltage V2 for acquiring illuminance is executed.

As the method of controlling the drive voltage V2 for acquiring illuminance during the illuminometer mode, a method of controlling the drive voltage V2 for acquiring illuminance to approach the drive voltage V1 for imaging corresponding to the calculated illuminance of the object is also conceivable. For example, a one-time control amount of voltage may be determined and the drive voltage V2 for illuminance may be controlled in units of the control amount in Step 204. As a result, since a rapid increase/decrease in voltage during the illuminometer mode is suppressed, it is possible to reduce the time necessary for switching the drive voltage to the drive voltage V1 for imaging while improving the accuracy of measuring the illuminance.

Figure 8:
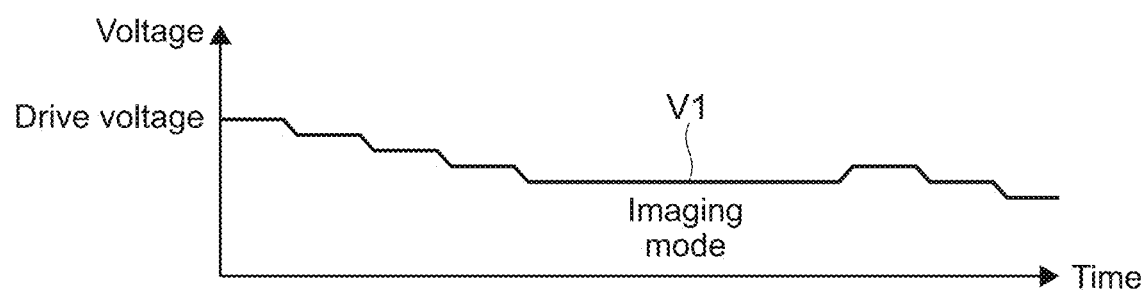
FIG. 8 is a graph showing an example of a temporal change in drive voltage for describing another example of the imaging operation.

FIG. 8 is a graph showing an example of a temporal change in drive voltage for describing another example of the imaging operation. As shown in FIG. 8, the illuminometer mode is not used, the illuminance is calculated on the basis of the image signal of the object during the imaging mode, and the drive voltage V1 for imaging may be controlled in real time.

That is, on the basis of the image signal obtained by driving of the plurality of pixel cells 11 with the drive voltage V1 for imaging, the illuminance of the object is acquired as imaging-related information. On the basis of the acquired illuminance of the object, the drive voltage V1 for imaging may be controlled. As a result, it is possible to appropriately control the drive voltage during imaging of the object and reduce the power consumption.

Note that even in the case where a part of the plurality of pixel cells 11 is driven to generate an image signal, the drive voltage V1 for imaging can be controlled in real time on the basis of the image signal. Further, in order to suppress the influence due to the change in drive voltage, correction or the like may be executed on the image signal or image data. When performing observation or monitoring, the imaging operation shown in FIG. 8 is effective, for example, in the case where there is no problem in the occurrence of uneven image quality due to voltage changes.

As described above, in the imaging system 100 according to this embodiment, the drive voltage for driving the plurality of pixel cells 11 is controlled on the basis of the acquired illuminance of the object. As a result, is possible to reduce the power consumption.

For example, in order to reduce the power consumption, it is conceivable to drive, with a low voltage, a light reception device that converts incident light into charges. In this case, under low illuminance conditions, required imaging quality is not satisfied, and it is difficult to achieve required image quality.

Further, in the technology described in Patent Literature 1, although a voltage is applied to the vertical signal line to increase the FD capacity in order to increase the dynamic range, the capacity of the vertical signal line is much larger than the FD capacity and thus, the power consumption is increased by the amount corresponding to the application of the voltage to the vertical signal line. That is, in the technology described in Patent Literature 1, since a voltage is applied as a means for improving the image quality, the power consumption is sacrificed.

As long as the purpose of observation, monitoring, or the like is achieved, there is no need to be concerned with whether or not the captured image has high image quality. For example, captured images under low illuminance at night or the like often have image quality mixed with random noise. There is no problem even if similar random noise is mixed also in daytime imaging with high illuminance.

Further, in a continuous imaging operation, a dynamic change in drive voltage often affects (e.g., unevenness) the image. Meanwhile, under the condition of occasional imaging, it is possible to perform imaging at an optimal voltage on the basis of illuminance information acquired during a non-imaging period, considering the image quality and power consumption at the illuminance. Further, if image unevenness does not affect the image recognition, there is no problem even if the voltage is changed during imaging.

On the basis of such a viewpoint, in the imaging system 100, the drive voltage itself is changed in conjunction with the illuminance in accordance with the required imaging quality and imaging frequency, e.g., imaging is performed with low voltage drive when the illuminance is high and imaging is performed with higher voltage drive when the illuminance is low. As a result, it is possible to realize low power consumption.

In particular, by reducing the drive voltage under imaging conditions in which sufficient illuminance is secured, a low power consumption effect proportional to the square of the voltage can be achieved. For example, in the case where the drive voltage is variable in the range of 1.8 V to 2.8 V, the power consumption of the corresponding circuit part can be reduced by approximately 41.3% on the basis of the calculation formula $(1.8)^2/(2.8)^2 \times 100$ in principle. Further, since the drive voltage is controlled, low power consumption is realized without adding a circuit in the pixel array of the image sensor.

Second Embodiment

An imaging system according to a second embodiment of the present technology will be described. In the following description, description of the configuration and operation similar to those in the imaging system 100 described in the above-mentioned embodiment will be omitted or simplified.

Figure 9:
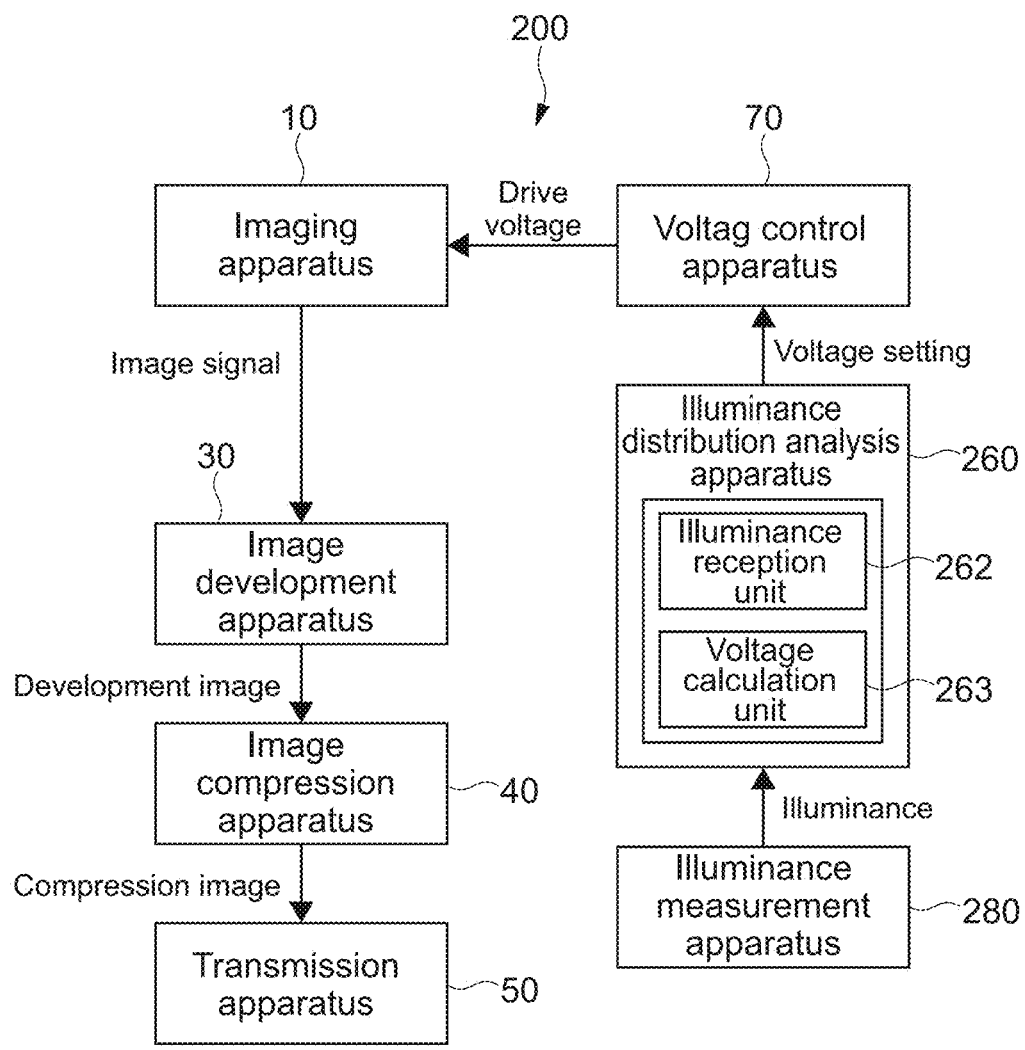
FIG. 9 is a block diagram showing a configuration example of an imaging system according to a second embodiment.

FIG. 9 is a block diagram showing a configuration example of the imaging system according to the second embodiment. An imaging system 200 includes an illuminance measurement apparatus 280. The illuminance measurement apparatus 280 is capable of measuring illuminance of an object, and an arbitrary apparatus such as an illuminance sensor may be used.

An illuminance distribution analysis apparatus 260 includes an illuminance reception unit 262 and a voltage calculation unit 263 as functional blocks. The illuminance reception unit 262 receives the illuminance of an object measured by the illuminance measurement apparatus 280. The voltage calculation unit 263 calculates, on the basis of the received illuminance of the object, the drive voltage V1 for imaging of the object. In this embodiment, the illuminance reception unit 262 corresponds to an acquisition unit, and the voltage calculation unit 263 corresponds to a voltage control unit.

Figure 10:
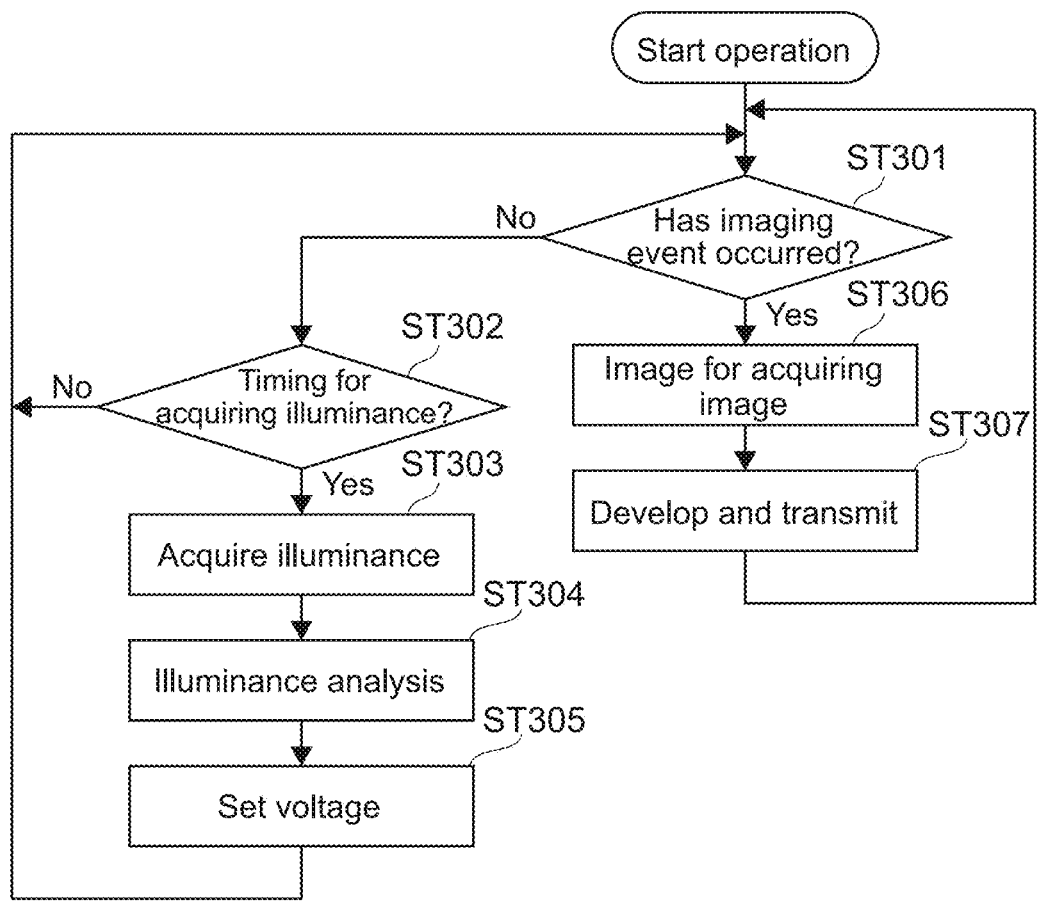
FIG. 10 is a flowchart showing an example of an imaging operation by the imaging system.
Figure 11:
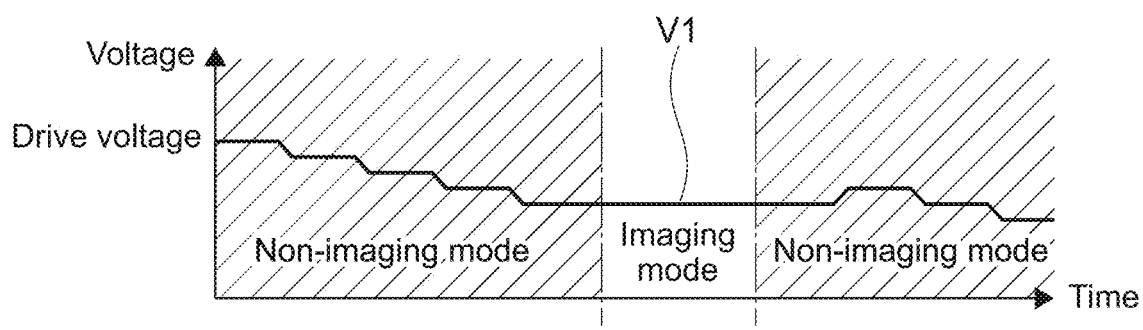
FIG. 11 is a graph showing an example of a temporal change in drive voltage in the imaging operation shown in FIG. 10.

FIG. 10 is a flowchart showing an example of the imaging operation by the imaging system 200. FIG. 11 is a graph showing an example of a temporal change in drive voltage in the imaging operation shown in FIG. 10. In this embodiment, a non-imaging mode is kept while an imaging even has not occurred, the drive voltage V1 for imaging is calculated on the basis of the illuminance of the object calculated by the illuminance measurement apparatus 280.

As shown in FIG. 10, whether or not an imaging event has occurred is determined (Step 301). In the case where it is determined that an imaging event has not occurred (No in Step 301), whether or not it is a timing for acquiring illuminance is determined (Step 302). In the case where it is determined that it is not the timing for acquiring illuminance (No in Step 302), the processing returns to Step 301. In the case where it is determined that it is the timing for acquiring illuminance (Yes in Step 302), the illuminance measurement apparatus 280 calculates illuminance and the drive voltage V1 for imaging is set on the basis of the illuminance (Step 303 to Step 305).

Note that in the case where an imaging event has not occurred, the acquisition of illuminance, analysis, and setting of the drive voltage V1 for imaging of Steps 303 to 305 may be executed without executing the determination of Step 302.

In the case where it is determined that an imaging event has occurred (Yes in Step 301), the mode is switched to the imaging mode and imaging for acquiring an image of an object is executed with the drive voltage V1 for imaging set by the illuminance distribution analysis apparatus 260 (Step 306). Then, the development and transmission of the captured image are executed (Step 307), the processing returns to Step 301, and whether or not an imaging event is occurring is determined.

In the example shown in FIG. 11, in the non-imaging mode, the drive voltage V1 for imaging is controlled on the basis of the illuminance of the object. Then, in accordance with the switching of the mode to the imaging mode, the object is imaged with the drive voltage V1 set in the non-imaging mode without change.

Note that in the non-imaging mode, the drive voltage V1 set on the basis of the illuminance of the object may be supplied to the imaging apparatus 10. Alternatively, in the non-imaging mode, only the setting value of the drive voltage V1 is held and supply of a voltage to the imaging apparatus 10 may be restricted. Then, at the timing when the mode is switched to the imaging mode, the set drive voltage V1 may be supplied to the imaging apparatus 10. By restricting the voltage supply to the imaging apparatus 10 during the non-imaging mode, it is possible to achieve power consumption.

Other Embodiments

The present technology is not limited to the above-mentioned embodiments, and other various embodiments can be realized.

The imaging-related information is not limited to illuminance of an object, and controls of the drive voltage may be executed on the basis of other imaging-related information.

Figure 12:
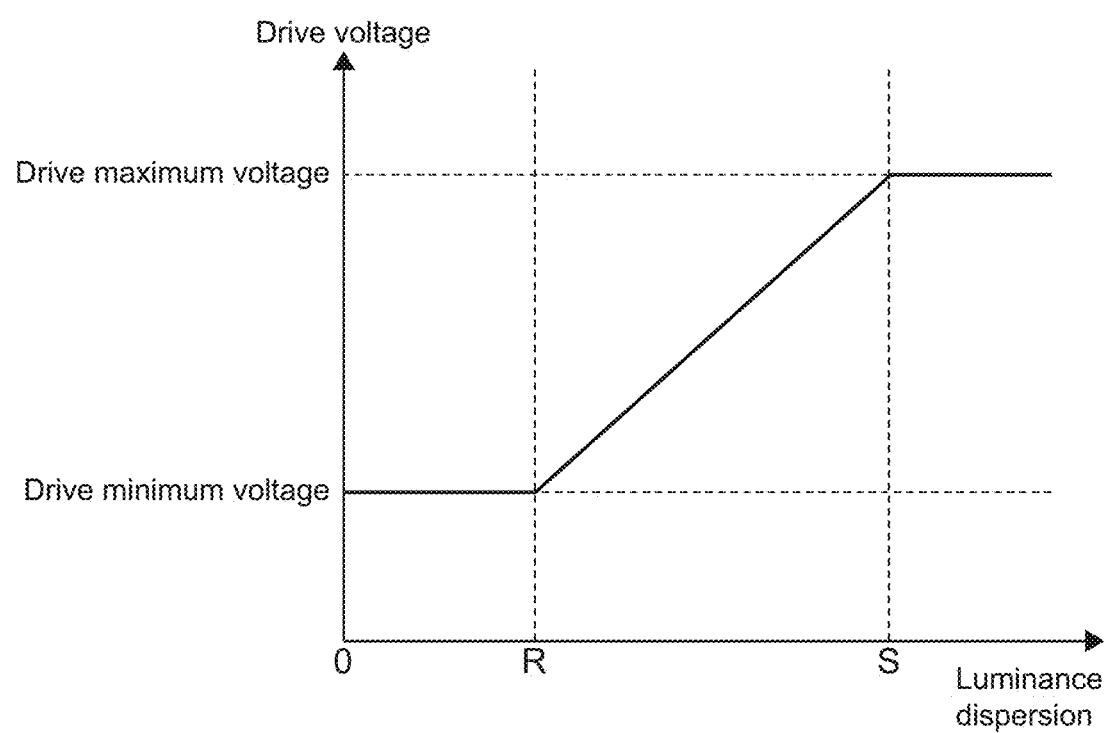
FIG. 12 is a graph showing an example of controlling the drive voltage in accordance with the luminance distribution of a captured image.
Figure 13A:
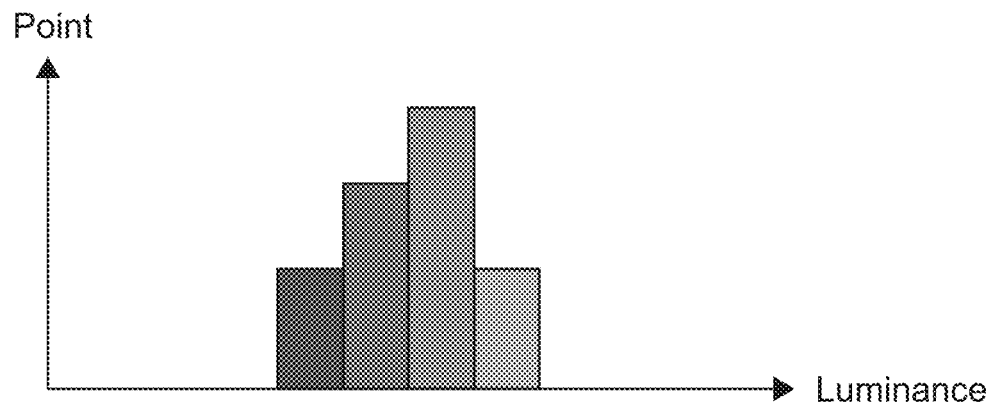
FIGS. 13A and 13B FIGS. 13A and 13B are diagrams showing an example of the luminance dispersion of the captured image.
Figure 13B:
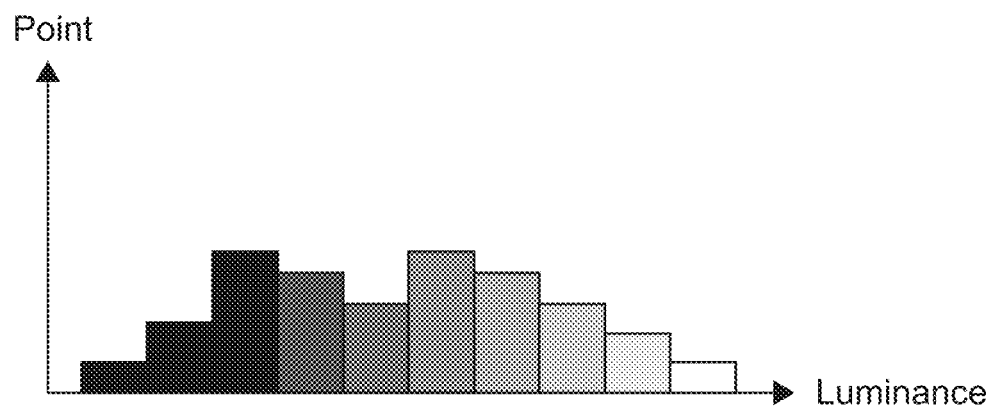

FIG. 12 is a graph showing an example of controlling the drive voltage in accordance with the luminance distribution of a captured image. FIGS. 13A and 13B are diagrams showing an example of the luminance dispersion of a captured image. The luminance dispersion of the captured image can be calculated on the basis of each pixel signal. Note that on the basis of the pixel signal of a part of the pixel cells 11, the luminance dispersion of the captured image may be estimated.

As shown in FIG. 12, the drive voltage is decreased in the case where the luminance dispersion of the captured image is small (narrow), and the drive voltage is increased in the case where the luminance dispersion of the captured image is large (wide). For example, the drive minimum voltage is set in the range of the luminance dispersion from zero to a predetermined value R, and the drive voltage is set to be linearly increased up to the drive maximum voltage in accordance with the increase in the luminance dispersion in the range from the value R to a predetermined value S. In the range higher than the value S, the drive maximum voltage is set.

When the drive voltage is lowered, the dynamic range of the FD 22 that is a capacitive device unit is reduced on the basis of the relationship of Q=CV. Therefore, as shown in FIG. 13A, in the case where the luminance dispersion is narrow, the drive voltage is reduced to suppress the dynamic range. As shown in FIG. 13B, in the case where the luminance dispersion is wide, the drive voltage is increased to increase the dynamic range. By executing such control in the range realized by the required image quality level, it is possible to reduce the power consumption.

The value R and the value S of the luminance dispersion shown in FIG. 12 only need to be appropriately set on the basis of the characteristics of the imaging apparatus, imaging conditions, imaging environment, imaging purpose, object type, and the like. Further, the present technology is not limited to the linear control, and arbitrary control such as non-linear control using polynomials, exponents/logarithms, or the like and phased control in a stepwise manner may be executed.

Similarly to the above-mentioned measurement of illuminance, the mode for measuring the luminance distribution and the mode for imaging an object may be distinguished from each other, and the drive voltages V1 and V2 of the respective modes may be controlled. Alternatively, the drive voltage V1 may be controlled on the basis of the luminance distribution during the imaging mode.

Figure 14:
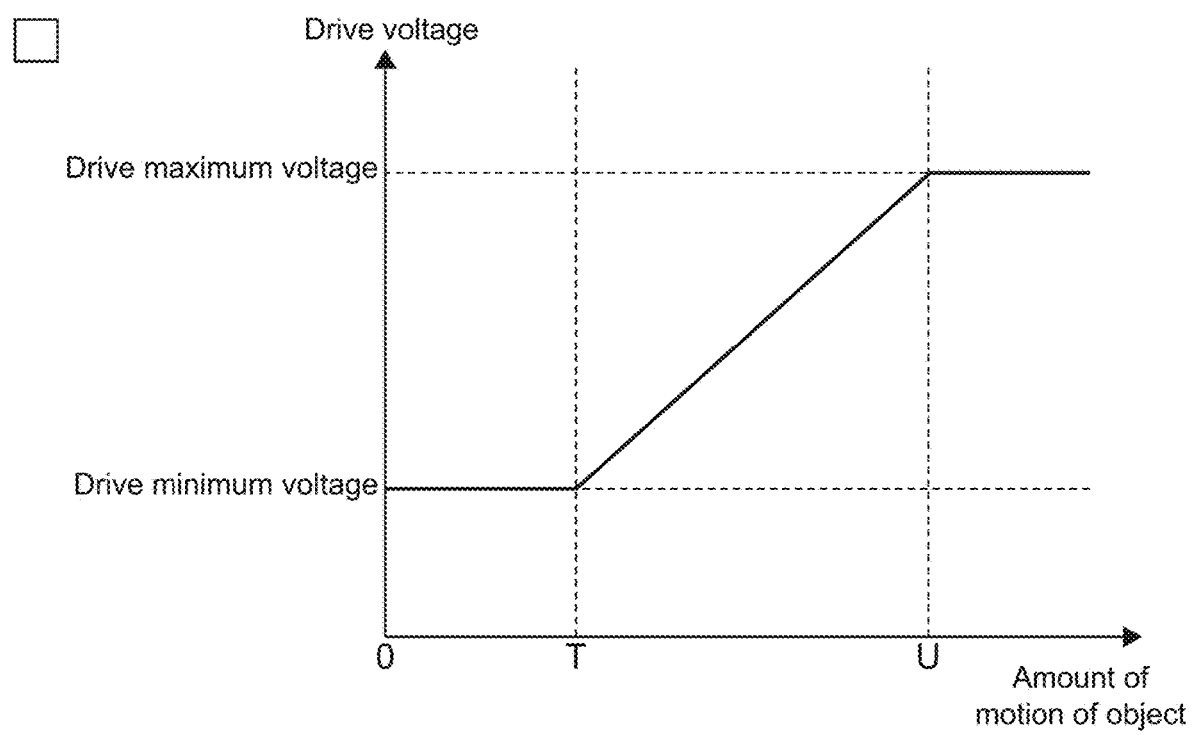
FIG. 14 is a graph showing an example of controlling the drive voltage in accordance with the amount of motion of an object.

FIG. 14 is a graph showing an example of controlling the drive voltage in accordance with the amount of motion of an object. As shown in FIG. 14, the drive voltage is decreased in the case where the amount of motion of an object is small, and the drive voltage is increased in the case where the amount of motion of the object is large. For example, the drive minimum voltage is set in the range of the amount of motion from zero to a predetermined amount of motion T, and the drive voltage is set to be linearly increased up to the drive maximum voltage in accordance with the increase in the luminance dispersion in the range from the amount of motion T to a predetermined amount of motion U. In the range higher than the amount of motion U, the drive maximum voltage is set.

The method of calculating the amount of motion is not limited. By executing an arbitrary image analysis technology including pattern matching, inter-frame prediction, cross-correlation calculation, and the like on the captured image (image signal), it is possible to identify the object and calculate the amount of motion of the object.

In the case where the amount of motion of the object is large, it is difficult to lengthen the exposure time and suppress degradation of image quality. In the present technology, in the case where the amount of motion of the object is small, the drive voltage is lowered and the dynamic range of the FD 22 is suppressed to execute imaging. In the case where the amount of motion of the object is large, the drive voltage is increased and the dynamic range of the FD is increased to execute imaging. By executing such control in the range realized by the required image quality level, it is possible to reduce the power consumption.

The amount of motion T and the amount of motion U shown in FIG. 14 may be appropriately set on the basis of the characteristics of the imaging apparatus, imaging conditions, imaging environment, imaging purpose, object type, and the like. Further, the present technology is not limited to the linear control, and arbitrary control such as non-linear control using polynomials, exponents/logarithms, or the like and phased control in a stepwise manner may be executed.

The mode for measuring the amount of motion of an object and the mode of imaging an object may be distinguished from each other, and the drive voltages V1 and V2 of the respective modes may be controlled. Alternatively, the drive voltage V1 may be controlled on the basis of the amount of motion during the imaging mode.

As the imaging-related information, information other than the illuminance of an object, the luminance distribution of a captured image, and the amount of motion of an object may be used. For example, arbitrary information relating to imaging, such as the temperature of an imaging apparatus, may be used as the imaging-related information.

Figure 15:
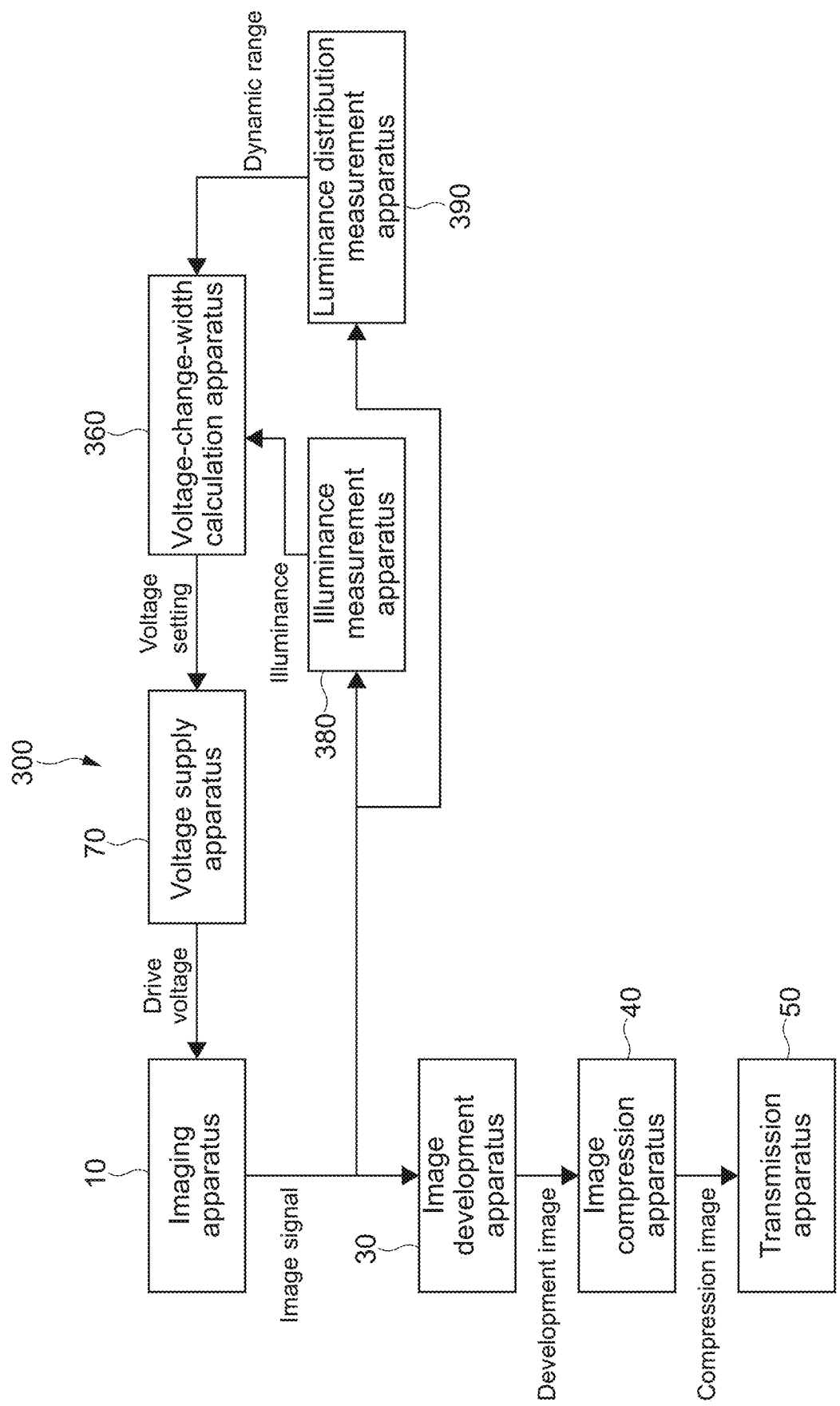
FIG. 15 is a block diagram showing a configuration example of an imaging system according to another embodiment.

FIG. 15 is a block diagram showing a configuration example of an imaging system according to another embodiment. The drive voltage may be controlled on the basis of a plurality of different types of imaging-related information. For example, an imaging system 300 shown in FIG. 15 includes an illuminance measurement apparatus 380, a luminance distribution measurement apparatus 390, and a voltage-change-width calculation apparatus 360.

The illuminance measurement apparatus 380 calculates the illuminance of an object as imaging-related information. The illuminance of the object is calculated on the basis of the image signal output by the imaging apparatus 10. Alternatively, the illuminance of the object may be independently calculated by using its own sensor mechanism or the like without using the image signal.

The luminance distribution measurement apparatus 390 analyzes the luminance distribution of a captured image and calculates the luminance dispersion (dynamic range) as imaging-related information. The dynamic range of the captured image is calculated on the basis of the image signal output by the imaging apparatus 10. Another method may be adopted.

The voltage-change-width calculation apparatus 360 is an embodiment of the control apparatus according to the present technology, and controls, on the basis of the illuminance of the object output from the illuminance measurement apparatus 380 and the dynamic range of the captured image output from the luminance distribution measurement apparatus 390, the drive voltage to be supplied to the imaging apparatus 10.

Figure 16:
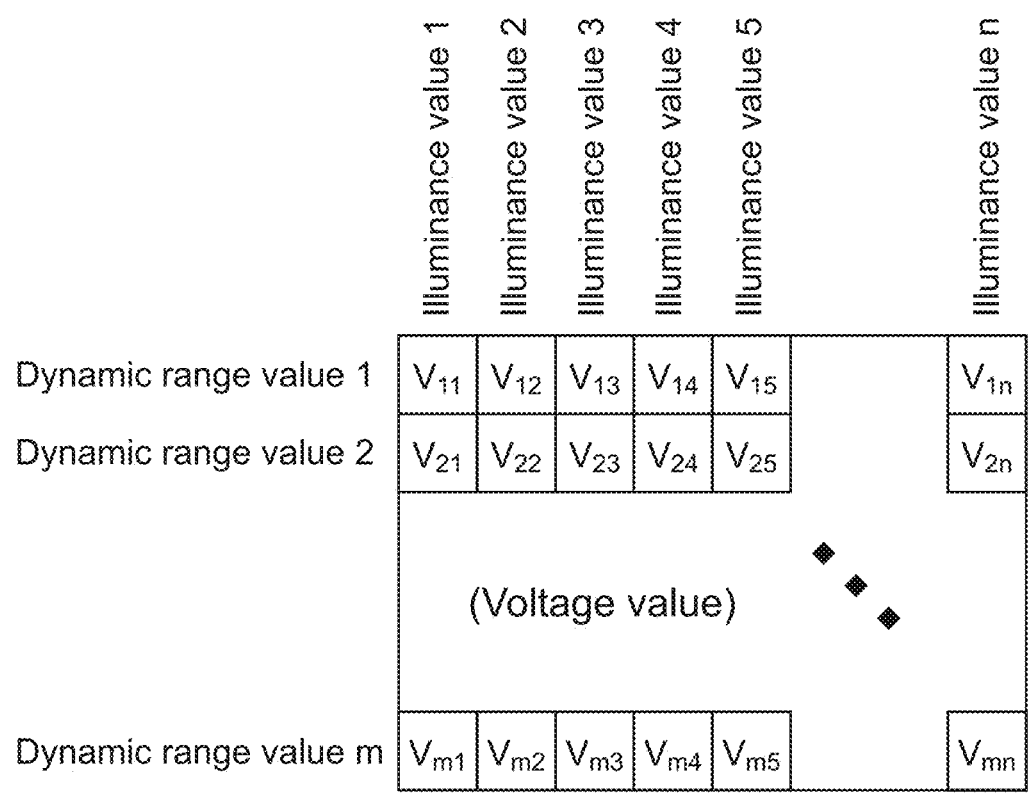
FIG. 16 is a schematic diagram showing an example of a two-dimensional lookup table.

For example, as shown in FIG. 16, a two-dimensional lookup table showing the relationship between the combination of the illuminance value and the dynamic range value, and the drive voltage is created in advance and stored. By referring to the lookup table, it is possible to easily control the drive voltage. Instead of the multidimensional lookup table, the drive voltage may be controlled using multidimensional arithmetic expression. Alternatively, an arbitrary method may be adopted.

The drive voltage may be controlled on the basis of three or more pieces of imaging-related information. For example, an arbitrary combination may be selected from illuminance information, luminance distribution information, information regarding the amount of motion, temperature, and the like to calculate the optimal drive voltage. By using the multidimensional lookup table or multidimensional arithmetic expression, it is possible to easily control the drive voltage even in the case where three or more pieces of imaging-related information are used.

It goes without saying that the lookup table or arithmetic expression may be used also in the case where one piece of imaging-related information is used.

The case where an imaging apparatus including a CMOS image is used has been described above. The present technology is not limited thereto, and the present technology is applicable also to a case where an imaging apparatus including another image sensor such as a CCD image sensor is used. That is, the present technology is applicable also to a case where a plurality of pixel units is configured as a pixel unit of a CCD image sensor or the like. By controlling, on the basis of imaging-related information such as illuminance of an object, the voltage to be applied to the capacitive device unit of each of the plurality of pixel units, it is possible to reduce the power consumption.

The case where the voltage to be applied to the capacitive device of each of the plurality of pixel units is controlled by controlling the drive voltage to be applied to the imaging apparatus has been described above as an example. That is, the case where the power source voltage VDD in the imaging apparatus is controlled in conjunction with the supply voltage from the voltage supply apparatus has been described above as an example.

For example, depending on the configuration of the imaging apparatus, the power source voltage VDD and each voltage signal are individually controlled on the basis of the voltage supplied from the outside in some cases. In such a case, for example, the control of the drive voltage for driving each of the plurality of pixel units includes controlling the voltage application to the capacitive device unit in some cases. For example, the control of the drive voltage for driving each of the plurality of pixel units includes transmitting a control signal or the like for controlling the voltage to be applied to the capacitive device unit in some cases.

In the above, an illuminance distribution analysis apparatus or voltage-change-width calculation apparatus that is the control apparatus according to the present technology has been configured separately from the imaging apparatus. The present technology is not limited thereto, and an apparatus that controls the drive voltage on the basis of imaging-related information may be integrally formed with the imaging apparatus. That is, the function of controlling the drive voltage on the basis of the imaging-related information may be installed in the imaging apparatus. In this case, the imaging apparatus functions as both the control apparatus according to the present technology and the imaging apparatus according to the present technology. Further, the function of the voltage supply apparatus, image development apparatus, image compression apparatus, or transmission apparatus may be installed in the imaging apparatus (control apparatus).

At least two features of the above-mentioned features according to the present technology may be combined. Specifically, various features described in each embodiment may be arbitrarily combined without distinguishing the embodiments with each other. Further, the various effects described above are merely examples and are not limited, and additional effects may be exerted.

It should be noted that the present technology may take the following configurations.

(1) A control apparatus, including:
an acquisition unit that acquires imaging-related information relating to imaging to be executed by an imaging apparatus including a plurality of pixel units that converts incident light into charges and accumulate the charges; and
a voltage control unit that controls, on a basis of the acquired imaging-related information, a drive voltage for driving each of the plurality of pixel units.

(2) The control apparatus according to (1), in which
the imaging-related information includes at least one of illuminance of an object, luminance distribution of a captured image, an amount of motion of the object.

(3) The control apparatus according to (2), in which
the voltage control unit decreases, where the illuminance of the object is high, the drive voltage and increases, where the illuminance of the object is low, the drive voltage.

(4) The control apparatus according to (2), in which
the voltage control unit decreases, where luminance dispersion of the captured image is small, the drive voltage and increases, where the luminance dispersion of the captured image is large, the drive voltage.

(5) The control apparatus according to (2), in which
the voltage control unit decreases, where the amount of motion of the object is small, the drive voltage and increases, where the amount of motion of the object is large, the drive voltage.

(6) The control apparatus according to any one of (1) to (5), in which
the voltage control unit sets, on a basis of the acquired imaging-related information, the drive voltage as a first drive voltage for imaging an object.

(7) The control apparatus according to (6), in which
the voltage control unit sets the drive voltage as a second drive voltage for acquiring the imaging-related information, and
the acquisition unit acquires the imaging-related information on a basis of an image signal obtained by driving of at least a part of the plurality of pixel units with the second drive voltage.

(8) The control apparatus according to (7), in which
the voltage control unit controls the second drive voltage on a basis of the acquired imaging-related information.

(9) The control apparatus according to (8), in which
the voltage control unit controls the second drive voltage to be the first drive voltage corresponding to the acquired imaging-related information.

(10) The control apparatus according to (8), in which
the voltage control unit controls the second drive voltage to approach the first drive voltage corresponding to the acquired imaging-related information.

(11) The control apparatus according to (6), in which
the acquisition unit acquires the imaging-related information on a basis of an image signal obtained by driving of at least a part of the plurality of pixel units with the first drive voltage, and
the voltage control unit controls the first drive voltage on a basis of the acquired imaging-related information.

(12) The control apparatus according to any one of (1) to (12), in which
the voltage control unit controls a voltage to be applied to a capacitive device unit of each of the plurality of pixel units, the capacitive device unit accumulating the converted charges.

(13) The control apparatus according to any one of (1) to (12), in which
the plurality of pixel units is configured as a pixel unit of a CMOS image sensor or a pixel unit of a CCD image sensor.

(14) An imaging apparatus, including:
a plurality of pixel units that converts incident light into charges and accumulate the charges;
an acquisition unit that acquires imaging-related information relating to imaging; and
a voltage control unit that controls, on a basis of the acquired imaging-related information, a drive voltage for driving each of the plurality of pixel units.

REFERENCE SIGNS LIST

V1 first drive voltage
V2 second drive voltage
10 imaging apparatus
11 pixel cell
17 PD (Photo Diode)
22 FD (Floating Diffusion)
60, 260 illuminance distribution analysis apparatus
32 illuminance calculation unit
63, 263 voltage calculation unit
70 voltage supply apparatus
100, 200, 300 imaging system
262 illuminance reception unit
280, 380 illuminance measurement apparatus
360 voltage-change-width calculation apparatus
390 luminance distribution measurement apparatus

The invention claimed is:

1. A control apparatus, comprising:
circuitry configured to:
acquire imaging-related information associated with an imaging operation to be executed by an imaging apparatus, wherein
the imaging apparatus includes a plurality of pixel units that converts incident light into charges and accumulates the charges, and
the imaging-related information includes an amount of motion of an object; and
control a drive voltage to drive each of the plurality of pixel units based on the amount of motion of the object.

2. The control apparatus according to claim 1, wherein
the imaging-related information further includes at least one of illuminance of the object or luminance distribution of a captured image, and
the circuitry is further configured to control the drive voltage to drive each of the plurality of pixel units based on at least one of the illuminance of the object or the luminance distribution of the captured image.

3. The control apparatus according to claim 2, wherein the circuitry is further configured to:
decrease the drive voltage where the illuminance of the object is high; and
increase the drive voltage where the illuminance of the object is low.

4. The control apparatus according to claim 2, wherein the circuitry is further configured to:
decrease the drive voltage where the luminance distribution of the captured image is small; and
increase the drive voltage where the luminance distribution of the captured image is large.

5. The control apparatus according to claim 1, wherein the circuitry is further configured to:
decrease the drive voltage where the amount of motion of the object is small; and
increase the drive voltage where the amount of motion of the object is large.

6. The control apparatus according to claim 1, wherein the circuitry is further configured to set, based on the acquired imaging-related information, the drive voltage as a first drive voltage for the imaging operation of the object.

7. The control apparatus according to claim 6, wherein the circuitry is further configured to:
set the drive voltage as a second drive voltage far to acquire the imaging-related information; and
acquire the imaging-related information based on an image signal obtained by a driving operation of at least a part of the plurality of pixel units with the second drive voltage.

8. The control apparatus according to claim 7, wherein the circuitry is further configured to control the second drive voltage based on the acquired imaging-related information.

9. The control apparatus according to claim 8, wherein the circuitry is further configured to change the second drive voltage to the first drive voltage corresponding to the acquired imaging-related information.

10. The control apparatus according to claim 8, wherein the circuitry is further configured to control the second drive voltage to approach the first drive voltage corresponding to the acquired imaging-related information.

11. The control apparatus according to claim 6, wherein the circuitry is further configured to:
   acquire the imaging-related information based on an image signal obtained by a driving operation of at least a part of the plurality of pixel units with the first drive voltage; and
   control the first drive voltage based on the acquired imaging-related information.

12. The control apparatus according to claim 1, wherein the circuitry is further configured to control a voltage to
   be applied to a capacitive device unit of each of the plurality of pixel units, and
   the capacitive device unit accumulates the converted charges.

13. The control apparatus according to claim 1, wherein the plurality of pixel units is one of a pixel unit of a CMOS image sensor or a pixel unit of a CCD image sensor.

14. An imaging apparatus, comprising:
   a plurality of pixel units configured to:
      convert incident light into charges; and
      accumulate the charges; and
   circuitry configured to:
      acquire imaging-related information associated with an imaging operation, wherein the imaging-related information includes an amount of motion of an object; and
      control a drive voltage to drive each of the plurality of pixel units based on the amount of motion of the object.

* * * * *